United States Patent
Su et al.

(10) Patent No.: US 6,723,228 B2
(45) Date of Patent: Apr. 20, 2004

(54) ADDITIVE USED IN CATALYTIC CRACKING OF HYDROCARBONS AND A PROCESS OF CATALYTIC CRACKING OF HYDROCARBONS USING THE SAME

(75) Inventors: Shuqin Su, Luoyang (CN); Guoliang Wang, Luoyang (CN); Haiqing Guo, Luoyang (CN); Xianliang Deng, Luoyang (CN); Longyan Wang, Luoyang (CN); Wenyi Qi, Luoyang (CN); Shufang Liu, Luoyang (CN); Baojian Shen, Luoyang (CN); Jinlong Liu, Luoyang (CN); Dongming Zhao, Luoyang (CN)

(73) Assignees: China Petrochemical Corporation, Beijing (CN); Luoyang Petrochemical Engineering Corporation, Luoyang (CN)

( * ) Notice: Subject to any disclaimer, the term of this patent is extended or adjusted under 35 U.S.C. 154(b) by 0 days.

(21) Appl. No.: 10/459,278

(22) Filed: Jun. 11, 2003

(65) Prior Publication Data

US 2003/0209468 A1 Nov. 13, 2003

Related U.S. Application Data

(62) Division of application No. 09/472,539, filed on Dec. 27, 1999, now abandoned.

(30) Foreign Application Priority Data

Dec. 29, 1998 (CN) ........................................ 98122188 A

(51) Int. Cl.$^7$ .............................................. C10G 11/00
(52) U.S. Cl. ....................... 208/113; 208/121; 208/122; 208/123; 208/120.1; 208/120.2; 208/120.3; 502/355; 502/349; 502/353; 502/305; 502/344; 502/317; 502/172; 502/200; 502/208

(58) Field of Search .................................. 208/113, 121, 208/122, 123, 120.1, 120.2, 120.3; 502/355, 349, 353, 305, 344, 317, 172, 200, 208

(56) References Cited

U.S. PATENT DOCUMENTS

| | | | | |
|---|---|---|---|---|
| 2,726,993 A | * | 12/1955 | Hickok et al. | ............... 208/285 |
| 3,855,307 A | * | 12/1974 | Rony et al. | ................. 568/454 |
| 4,562,167 A | * | 12/1985 | Bertus et al. | ................ 502/100 |
| 5,188,995 A | * | 2/1993 | Maholland et al. | ........... 502/28 |
| 5,972,208 A | * | 10/1999 | Goolsby et al. | ............. 208/152 |

* cited by examiner

*Primary Examiner*—Walter D. Griffin
*Assistant Examiner*—James Arnold, Jr.
(74) *Attorney, Agent, or Firm*—Ladas & Parry

(57) ABSTRACT

An additive used in catalytic cracking of hydrocarbons, which is in the form of homogeneous liquid and comprises a composite metal compound, wherein said composite metal compound consists of the oxides, hydroxides, organic acid salts, inorganic acid salts or metal organic complex compounds of at least one of the $1^{st}$ group metals and at least one of the $2^{nd}$ group metals, wherein the $1^{st}$ group metals are selected from the group consisting of the metals of the IIIA, IVA, VA, VIA groups of the Element Period Table, boron, silicon, phosphorous and tellurium; wherein the 2nd group metals are selected from the group consisting of alkali-earth metals, transition metals, and rare earth metals, is disclosed. A process of catalytic cracking of hydrocarbons, utilizing the additive is also disclosed. The additive can passivate metals and promote the oxidation of CO, and is operated easily with production cost decreased.

15 Claims, No Drawings

ADDITIVE USED IN CATALYTIC CRACKING OF HYDROCARBONS AND A PROCESS OF CATALYTIC CRACKING OF HYDROCARBONS USING THE SAME

This application is a division of U.S. Ser. No. 09/472,539, now abandoned, filed Dec. 27, 1999.

This invention relates to an additive used in catalytic cracking of hydrocarbons and a process of catalytic cracking of hydrocarbons using the same, especially to an additive used in catalytic cracking of heavy oils and a process of catalytic cracking of heavy oils using the same in petroleum processing industry.

The feedstocks of heavy oil catalytic cracking has the feature of high detrimental metal contents of Ni, V, Na and Fe, etc. In the process of catalytic cracking reaction and catalyst regeneration, almost all of Ni and V are deposited on the catalyst, poisoning the cracking catalyst. Nickel promotes the dehydrogenation reaction and deteriorates the selectivity of the catalyst and increases the coke yield and hydrogen content in dry gas; also, vanadium can migrate into the molecular sieve, damaging the molecular sieve lattice structure and reducing the catalyst activity. As the results, the light oil yield is reduced and economic benefit is affected. Thereby, to overcome the detrimental effect of heavy metal Ni and V on the catalyst in processing heavy oil, to enhance and improve the catalyst activity and selectivity, ensure the long-term smooth operation of heavy oil catalytic cracking unit and meet the requirements of contaminant emissions such as CO, etc stipulated by the increasingly stringent environmental regulations, some additives of special function or functions, such as metal passivator and CO oxidation promoter, etc are used in the catalyst cracking of hydrocarbons. The metal passivator maintains good catalyst activity and selectivity of the catalytic cracking mainly by passivating Ni, V, etc on the catalyst. The CO oxidation promoter promotes the oxidation of CO to $CO_2$, permitting the full combustion of CO in the dense-phase zone of the regenerator. This prevents the damage of equipment by "post-burning" of CO in the dilute-phase zone and minimizes the environmental pollution of CO when it is discharged with the flue gas emission. Furthermore, the full combustion of CO makes it possible to fully recover the otherwise lost energy from CO.

The existing metal passivator are classified into two categories in terms of function, i.e. the single-function metal passivator which is nickel passivator or vanadium passivator composed of single effective metal like Sb, Sn or Bi; and difunction metal passivator composed of composite metals like Sb—Sn, Sb—Bi, Sb—Re, etc which can simultaneously passivate nickel and vanadium. There are two ways for the addition of metal passivators: one is to add it to the reactor with the catalytic cracking feedstock and this method is usually applied for the liquid metal passivator. The other is to add it to the reactor with the catalyst and this method is usually applied for solid metal passivator such as vanadium trapping agent.

In the art, a number of patents relating to metal passivators and CO oxidation promoters, such as U.S. Pat. Nos. 4,562,167 and 5,565,399 are disclosed. One liquid metal passivator is disclosed in U.S. Pat. No. 4,562,167 in which the liquid metal passivator is a liquid solution or suspension containing Sb or at least one of Sb compounds and Sn or at least one of Sn compounds, wherein the weight ratio of antimony to tin is 0.5:1 to 10:1. It can passivate the detrimental metals such as Ni, V and Fe etc deposited on the catalytic cracking catalyst, but it possesses no function to reduce CO emission in regenerator flue gas. In U.S. Pat. No. 5,565,399, a CO oxidation promoter which promotes the oxidation of CO is disclosed. Said promoter comprises Pt, alumina, lanthanum oxide and cerium oxide, wherein platinum is supported on the spherical alumina which contains at least 2 wt. % of lanthanum oxide and 3~8 wt. % of cerium oxide and the supported Pt is 50~1000 ppm. This promoter is effective in reducing CO emission in regenerator flue gas but has no function to passivate the detrimental metals Ni and V on the catalytic cracking catalyst. The particulate CO promoter is added into the reactor together with the catalyst.

It can be found from the existing patents of metal passivator and CO oxidation promoter that efforts have been made to develop a catalytic cracking assistant with multiple functions but little success is achieved. The metal passivators or CO oxidation promoters have single function which is demonstrated by the fact that the passivator can only passivate the detrimental metals and can not reduce CO emission and that the CO oxidation promoter can only reduce the CO emission and can not passivate the contaminating metals. But in the commercial practice, these two functions are simultaneously needed by the process unit. Therefore, both metal passivator and CO oxidation promoter have to be added to the unit. In addition, most commercial metal passivators are liquid, which are added to the reactor by mixing them with the feed oil; whereas most oxidation promoters are solid, which are introduced to the reactor with the catalyst by catalyst loading system. This means that, for a process unit, different additives need to be added by different addition systems to meet the different function requirements. This complicates the operation and increases the operating and management cost. If the liquid CO oxidation promoter is intended to be used, the noble metals, such platinum, palladium, which is usually included therein must be transformed into their stable compounds, such as platinum chloride, which will corrode the devices.

One object of the present invention is to provide a liquid multi-function additive used in the catalytic cracking of hydrocarbons, in order to solve the problem of single-function of existing technologies, that is, the additive can only passivate the detrimental nickel and vanadium deposited on the catalyst or can only reduce the CO emission from flue gas. The present additive is effective in both passivating the detrimental nickel and vanadium deposited on the catalytic cracking catalyst and reducing CO emission from flue gas, and is easily operated with production cost decreased.

The further object of the present invention is to provide a process of catalytic cracking of hydrocarbons using the present additive.

The term "catalytic cracking" used in the present invention includes gas oil fluid catalytic cracking (FCC), residuum catalytic cracking (RCC), deep catalytic cracking (DCC) and other catalytic conversion processes based upon the continuous catalytic cracking reaction-regeneration mechanisms for processing hydrocarbons, such as MGG, ARGG and MIO, and the like family processes.

The term "metal" used in the present invention includes metal and metalloid.

The present additive is characterized in that: said additive is in the form of homogeneous liquid and comprises a composite metal compound, wherein said composite metal compound consists of the oxides, hydroxides, organic acid salts, inorganic acid salts or metal organic complex compounds of at least one of the 1st group metals and at least one of the 2nd group metals, said 1st group metals include the metals of the IIIA, IVA, VA, VIA group of the Element Period Table, boron, silicon, phosphor and tellurium, preferably antimony, bismuth and combinations thereof: said 2nd group metals include alkali-earth metals, transition metals and rare earth metals, preferably Cd, Zn, Mg, Ca, Sr, Ba, Cr, Mo, Mn, Co, Cu, Sc, Ti, La, Ce, Pr, Nd, Sm, Eu and combinations thereof.

The present liquid additive is either oil soluble or water soluble depending upon its composition, it can be prepared as solutions colloid emulsions suspension and other homogeneous liquid dispersion. The oil-soluble additive can be dispersed well in the feed oil, while the water soluble additive is inexpensive and easy to clean and operate.

The contents and ratios of said metal components, dispersion medium and optional assistant components are not critical, so long as the homogeneous liquid can be formed. The ratio of the 1st group metal component to the 2nd group metal component is also not critical, and it depends on the amount of nickel and vanadium in the catalytic cracking feedstock and the desired passivation and CO oxidation promotion effects. Moreover, in industrial practice, the desired passivation and CO oxidation promotion effects can be obtained by adjusting the amount of the present additive added into the catalytic cracking system.

Preferably, the content of the 1st group metal component is 5%~15% by weight, the content of the 2nd group metal component is 2%~13% by weight; more preferably, the content of 1st group metal is 7%~10% by weight, the content of the 2nd group metal is 3%~7% by weight; most preferably, the content of the 1st group metal is 7.5%~9.5% by weight, the content of the 2nd group metal is 4.5%~6.0% by weight.

The present additive is preferably used in the form of solution. In the case of solution, said additive comprises said composite metal compound solvent and optional cosolvent, said solvent is preferably selected from water, alcohols, hydrocarbons and combinations thereof, said cosolvent is preferably selected from alcohols, ethers, esters, amines, amides, polyethers, alcohol amines and combinations thereof. Preferably, the content of cosolvent is 1%~15% by weight, more preferably 3%~5% by weight.

The preparation of the present additive in the form of solution is as follows: the reaction equivalent compound of the 1st group metal, for example its oxide, reacts with organic acid or anhydride in the solvent such as water or xylene. The reaction condition is under agitation, refluxed for 2~40 hours, preferably 3~8 hours at the refluxing temperature of solvent. The reaction product is then cooled and added with compounds of alkali earth metals, transition metals or rare earth metals for continuous reaction for 2~4 hours under agitated conditions. Afterward, the cosolvent is added and mixed for uniform reaction mixture. The resulting reaction product is homogeneous transparent or translucent liquid.

The preparation of the dispersion such as colloid, emulsion, and suspension is as follows: the metal compounds, dispersion medium and disperser at the desired ratio are combined at the suitable temperature and mixed until homogeneous. Then the resulting mixture is treated by colloid mill or ultrasonic device to form the stable and homogeneous liquid dispersion.

In the further aspect, the present invention provides a process of catalytic cracking of hydrocarbon, said process comprises utilizing the additive of the present invention based upon the catalytic cracking feed stock properties and/or the amount of nicked and vanadium deposited on the equilibrium catalyst as well as the desired effect of CO oxidation promotion.

The present additive is very convenient to use since it is in the form of homogeneous liquid. One convenient addition method is to add to the reactor by simply mixing it with the catalytic cracking feed stream at certain ratio based on the catalytic cracking feedstock properties and/or the amount of nickel and vanadium on the equilibrium catalyst. Also, the present additive can be added to the reactor together with the recycled slurry oil or at the injection points of such as reaction termination agent.

The present additive can be used with different types of catalysts, such as REY type REHY type or ultra-stable Y type molecular sieve catalysts.

The present additive is suitable to any catalytic conversion process of hydrocarbons, especially to the catalytic cracking of heavy oil containing high amount of metals.

When the multi-function additive provided in the present invention is added to the feedstock of catalytic cracking of hydrocarbons with 2000~10000 ppm contaminant nickel and 2000~8000 ppm contaminant vanadium on the equilibrium catalyst, the hydrogen in the dry gas of the cracked products is reduced by 10~60%, the microactivity of the catalyst is increased by 1~10 units and CO in flue gas is decreased by 10~60%.

Besides multi-functions, the additive of the present invention offers the following advantages: (1) The said liquid additive is very convenient to use, and for the most of process units, it can be added to the reactor by any of the existing addition systems of passivators, slurry oil fouling inhibitors, riser reaction termination agents, etc in liquid form without additional investment for additional equipment. (2) the addition mode and addition rate of the additive can be flexibly adjusted in a timely manner based upon the variation of the amount of nickel and vanadium in the catalytic cracking feedstock as well as the requirement to CO oxidation promotion to maximize the economics and efficiency of the additive application. (3) the cost of the present additive is much lower than the total cost of passivator and CO oxidation promoter used to obtain the same effects of passivation and CO oxidation promotion. Since the said multi-function additive can passivate the nickel and vanadium, at the same time promote the oxidation of CO, it can reduce the amount of CO oxidation promoter used in the unit or completely replace it, leading to the reduction of the processing costs. Moreover, the solid CO oxidation promoters usually include some noble metal, such as platinum or palladium, which greatly increases the cost. The present liquid multi-function additive can act as CO oxidation promoter without using the noble metals, resulting in the further reduction of cost. In summary, the application of the present additive is significant in Industrial practice.

The evaluation technique for the multi-function additive as described in the present invention is to support or not to support nickel, vanadium and effective metals of the said multi-function additive on the fresh catalyst or the equilibrium catalyst of the commercial unit and carry out the cracking experiments respectively on the riser catalytic cracking pilot plant. The nickel passivation function of the multi-function additive is investigated by measuring the variations of hydrogen and $H_2/CH_4$ in the dry gas in cracked products, the vanadium passivation function of the said additive is investigated by measuring the variations of the microactivity of the equilibrium catalyst and the CO oxidation and conversion promotion function of the said additive is evaluated by the reduction of percentage by volume of CO in flue gas (compared with blank assay). The test conditions for said microactivity measurement are as follows:

Reaction temperature: 500° C.
Catalyst inventory: 5 g
Reaction duration: 70 second
Space velocity: 16 hr$^{-1}$
Catalyst to oil ratio: 3.2
The definition of microactivity (MA):

$$MA = 100 - \frac{W_1(100-G)}{W}$$

Wherein
W-feedstock weight
$W_1$-conversed oil weight
G-weight percent of gasoline in conversed oils The following examples further illustrate the present additive, its preparations, its usage and advantages.

EXAMPLE 1

31 g of acetic anhydride (99% purity), 40.5 g of $Bi_2O_3$, 61 g of xylene, 5 g of naphthenic acid available in the market were added to round-bottomed beaker with a reflux condensing pipe and refluxed for 10 hours with agitation and then cooled down to 80~90° C. After cooling to the aforesaid temperature. 137.5 g of strontium naphthenate, 98.6 g of zinc naphthenate were successively added and agitated for 2~4 hours, and finally uniformly mixed with 5 g of dimethylacetamide available in the market. The resulting solution was cooled and ready for use.

EXAMPLE 2

31 g of acetic anhydride (99% purity) commercially available, 29.2 g of $Sb_2O_3$ (99% purity) commercially available, 12.7 g of isooctanoic acid and 2 g of xylene available in the market are added to a round-bottomed beaker with a reflux condensing pipe and refluxed for 5 hours with agitation and then cooled down to 80~90° C. After cooling to the aforesaid temperature, 87.3 g of zirconium isocaprylate and 59.6 g of cerium isocaprylate were added successively and agitated for 4 hours. 5 g of monoethanolamine and 0.5 g of sorbitol isovalerate were added and agitated for 2 hours. The resulting solution was cooled and ready for use.

EXAMPLE 3

31 g of acetic anhydride (>99% purity), 29.2 g of $Sb_2O_3$ (>99% purity) available in the market and 20 g of water were added to the round-bottomed beaker with reflux condensing pipe, refluxed for 3 hours with agitation and cooled down. After cooling down, 50.8 g of magnesium acetate and 42.3 g of manganese acetate were added successively, heated to a temperature from 60° C. to 70° C., agitated for 2 hours and finally mixed with 2 g of monoethanolamine. The resulting solution was cooled and ready for use.

EXAMPLE 4

31 g of acetic anhydride (>99% purity) commercially available, 13.8 g of $Sb_2O_3$ (>99% purity) and 33.7 g of water were added to the round-bottomed beaker with reflux condensing pipe, refluxed for 3 hours with agitation and cooled down. After cooling down, 39.5 g of magnesium acetate and 18.5 g of strontium acetate are added successively, heated to a temperature from 60° C. to 70° C., agitated for 2 hours and finally mixed with 2 g of diglycolamine. The resulting solution was cooled and ready for use.

The properties of the multi-function additives prepared in the above 4 examples are listed in Table 1.

EXAMPLE 5

28 g acetic anhydride (99% purity) commercially available 20 g cerium carbonate (99% purity) and 25 g xylene commercially available were added to the round-bottomed beaker with reflux condensing pipe, refluxed for 4 hours with agitation at the temperature 135~138° C. After cooling down, 70 g ethyl borate, 15 g stannous isocaprylate are added successively, heated to 60° C.~70° C., agitated for 2 hours, and finally mixed with 2 g of monoethanolamine oleinate. The resulting solution was cooled and ready for use.

EXAMPLE 6

10 g cerium dioxide, 10 g $Bi_2O_3$, 5 g stannous oxide, 8 g octyl phenol polyoxyetheylene ether, 5 g triethanolamine oleinate, and 57 g 200$^\#$ mineral spirits commercially available were added to the round-bottomed beaker, heated to 60~70° C., mixed to uniform, then the resulting mixture was dispersed by ultrasonic for 10 hours, 3 g methyl t-butyl ether was added thereto to get a homogeneous suspension, and it is ready for use.

EXAMPLE 7

Four kinds of Catalysts A, B, C, D were selected. Catalysts A and B were fresh catalysts, wherein Catalyst A is 80% Octacat+20% XP-80L catalyst from Davison Company, Catalyst B is Ramcat-LC-1 ultra-stable Y (USY) catalyst from Davison company; Catalysts C and D are commercial equilibrium catalysts, wherein Catalyst C is CHZ-2 type ultra-stable molecular sieve catalyst made in China, Catalyst D is RHZ-300 semi-ultra-stable semi-synthesized molecular sieve catalyst. The physical and chemical properties of these catalysts are shown in Table 2.

The fresh Catalysts A and B were divided into 5 groups respectively as A1, A2, A3, A4 and A5 and B1, B2, B3, B4 and B5. A1 and B1 were used as the blank catalyst, A2, A4, B2 and B4 were the catalysts impregnated with contaminant metals Ni and V, and A3, A5, B3 and B5 were the catalysts further impregnated with the effective metals of additive prepared in Example 4. The commercial equilibrium Catalysts C and D were divided into 3 groups respectively as C1, C2 and C3 and D1, D2 and D3. C1 and D1 represent the metal-contaminated equilibrium catalysts of the commercial units, and C2 and D2 were the equilibrium catalysts impregnated with the effective metals of additive prepared in Example 4. D3 and D3 represent the equilibrium catalysts loaded, in riser catalytic cracking pilot plant with the effective metals of additive prepared in Example 5, that is the present additive was mixed with the catalytic cracking feedstock and then entered into the riser catalytic cracking pilot plant together with the feedstock, wherein the present additive was combined with the catalyst therein through the reaction-regeneration cycle, and the effective metals of the additive were loaded on the catalyst.

These catalysts treated as above are then aged at 800° C. and under 100% steam hydrothermal condition for 4 hours on fluidized bed plant. The resulting catalysts were tested for microactivity and used for riser catalytic cracking experiments.

TABLE 1

Main Physical and Chemical Properties of Multi-function Additives of Examples 1–4

|  | Example 1 | Example 2 | Example 3 | Example 4 |
|---|---|---|---|---|
| Sb, wt % | / | 10.7 | 13.8 | 8.3 |
| Bi, wt % | 9.6 | / | / | / |
| Zn, wt % | 2.6 | / | / | / |
| Sr, wt % | 5.1 | / | / | 4.0 |
| Zr, wt % | / | 4.6 | / | / |
| Ce, wt % | / | 3.9 | / | / |
| Mg, wt % | / | / | 4.9 | 4.8 |
| Mn, wt % | / | / | 8.6 | / |
| Density, g/cm$^3$, 20° C. | 1.35 | 1.38 | 1.41 | 1.33 |
| Viscosity, mm$^2$/s, 20° C. | 125 | 98 | 75 | 65 |
| Solubility | Oil Soluble | Oil Soluble | Water Soluble | Water Soluble |
| Appearance | Dark Amber Homogeneous Liquid | Yellow Translucent Homogeneous Liquid | Yellowish Transparent Liquid | Yellowish Transparent Liquid |

TABLE 2

Main Physical and Chemical Properties of Catalysts

| | Catalyst | C | A | D | B |
|---|---|---|---|---|---|
| Chemical Composition, wt % | Al$_2$O$_3$ | 41.96 | 26.82 | 50.4 | 44.5 |
| | Fe$_2$O$_3$ | 0.64 | 0.49 | 0.45 | 0.85 (Fe) |
| | Na$_2$O | 0.38 | 0.34 | 0.17 | 0.2 (Na) |
| | Re$_2$O$_3$ | 1.96 | 0.30 | / | 1.15 |
| Particle Distribution, wt % | <20 μm | 0.48 | 3.6 | 2.8 | 1.0 |
| | 20~40 μm | 17.42 | 14.3 | 18.9 | 10.0 |
| | 40~80 μm | 62.48 | 55.9 | 60.8 | 51.0 |
| | >80 μm | 19.62 | 26.2 | 17.5 | 38.0 |
| Physical Properties | Surface Area, m$^2$ · g$^{-1}$ | 89 | 164 | 90 | 155 |
| | Pore Volume, ml · g$^{-1}$ | 0.15 | 0.40 | 0.34 | 0.38 |
| | Bulk Density, g/ml | 0.72 | 0.86 | 0.76 | 0.79 |
| | Lattice Constant, Angstrom | 24.39 | 24.51 | / | / |
| | Micro Activity, 800° C., wt % aged for 4 hr | 59.1 | 72.3 | 52.8 | 73.6 |
| Metal Content | Ni, ug/g | 5365 | / | 8210 | / |
| | V, μg/g | 3218 | / | 5346 | / |

EXAMPLE 8

Catalytic cracking experiments were carried out a riser catalytic cracking pilot plant with a catalyst inventory of 4 kg and using the catalysts A, B, C and D as prepared in Example 7, wherein the feed oil properties for the experiments are shown in Table 3. The feed oil is the hydroconversed oil of Iran Residuum. Under the conditions as listed in Table 4, the resulting cracked product distribution is shown in Table 5, 6 and 7. As seen from the data listed in the above mentioned tables, for the fresh catalysts A and B, the hydrogen in dry gas was reduced by 36~50%, micro activity was increased by 3~6 unit, gasoline yield was increased by 2~5% and catalyst selectivity was improved when the present multi-function additive was employed. For catalysts C and D, if the present multi-function additive was used, the hydrogen in dry gas was reduced by 35~42%, micro activity was increased by about 2~4 unit, gasoline yield was increased by 1~3% and catalyst selectivity was improved. This demonstrates that the present liquid additive has significant passivation effect on nickel and vanadium.

The CO in the flue gas of the cracked products of each group produced by using the aforesaid 4 catalysts which has either supported or not supported with effective metals of the present additive is analyzed and the result data are listed in table 8. As seen from Table 8, CO emission from flue gas can be reduced by 15~50% if the present multi-function additive is employed.

TABLE 3

Main Properties of Feed Oil

| Conventional Analysis | Density, 20° C., g/cm$^3$ | 0.9296 |
|---|---|---|
| | Molecular Weight, MW | 451 |
| | Carbon Residue, wt % | 6.12 |
| | Viscosity, mm$^2$/s, 50° C. | 390 |
| | 100° C. | 36.4 |
| Element Analysis, wt % | C | 86.16 |
| | H | 12.81 |
| | S | 0.61 |
| | N | 0.13 |
| Metal Content, μg/g | Ni | 6.9 |
| | V | 9.6 |
| | Fe | 1.2 |
| | Na | <0.1 |

TABLE 4

Conditions of Riser FCC Pilot Experiment

| | |
|---|---|
| Reactor Temperature, °C. | 510 |
| Reactor Pressure, Mpa | 0.14 |
| Feed Preheat Temperature, °C. | 230 |
| Regenerator Temperature, °C. | 700 |
| Atomizing Water, wt % | 6.0 |
| Catalyst to Oil Ratio | 6.0 |

TABLE 5

Experiment Results of Riser Catalytic Cracking

| | | A | | | | |
|---|---|---|---|---|---|---|
| Catalyst | | A1 | A2 | A3 | A4 | A5 |
| Metal | Ni | 0 | 5000 | 5000 | 8000 | 8000 |
| Content, μg/g | V | 0 | 3000 | 3000 | 5000 | 5000 |
| | Sb | 0 | 0 | 3000 | 0 | 4000 |
| | Mg | 0 | 0 | 1500 | 0 | 2000 |
| | Sr | 0 | 0 | 1500 | 0 | 2000 |
| Micro Activity, wt % | | 72.3 | 62.5 | 67.6 | 59.3 | 63.7 |
| Cracked Product | Hydrogen | 0.08 | 0.22 | 0.14 | 0.36 | 0.18 |
| distribution, wt % | Cracked Gas | 16.37 | 15.90 | 15.99 | 15.70 | 15.60 |
| | Gasoline | 46.88 | 43.52 | 45.85 | 40.07 | 43.01 |
| | Diesel | 22.90 | 23.75 | 23.02 | 25.09 | 24.15 |
| | Heavy Oil | 6.41 | 8.22 | 7.35 | 9.10 | 8.20 |
| | Coke | 7.36 | 8.39 | 7.65 | 9.68 | 8.86 |
| Conversion, wt % | | 70.69 | 68.03 | 69.63 | 65.81 | 67.65 |
| Light Oil Yield, wt % | | 69.78 | 67.27 | 68.87 | 65.16 | 67.16 |
| $H_2/CH_4$, mol/mol | | 0.41 | 1.54 | 1.02 | 2.98 | 1.09 |
| Gasoline Selectivity | | 66.32 | 63.97 | 65.85 | 60.89 | 63.58 |
| Coke Selectivity | | 10.41 | 12.33 | 10.99 | 14.70 | 13.10 |

TABLE 6

Experiment Results of Riser Catalytic Cracking

| | | B | | | | |
|---|---|---|---|---|---|---|
| Catalyst | | B1 | B2 | B3 | B4 | B5 |
| Metal | Ni | 0 | 5000 | 5000 | 8000 | 8000 |
| Content, μg/g | V | 0 | 3000 | 3000 | 5000 | 5000 |
| | Sb | 0 | 0 | 3000 | 0 | 4000 |
| | Mg | 0 | 0 | 1500 | 0 | 2000 |
| | Sr | 0 | 0 | 1500 | 0 | 2000 |
| Micro Activity, wt % | | 73.6 | 68.0 | 71.2 | 63.8 | 69.5 |
| Cracked Product | Hydrogen | 0.11 | 0.26 | 0.13 | 0.35 | 0.18 |
| distribution, wt % | Cracked Gas | 15.76 | 15.56 | 15.44 | 14.21 | 15.29 |
| | Gasoline | 48.78 | 44.39 | 47.06 | 41.20 | 45.96 |
| | Diesel | 18.35 | 18.88 | 18.98 | 20.99 | 19.80 |
| | Heavy Oil | 9.09 | 12.58 | 10.33 | 14.66 | 10.72 |
| | Coke | 7.91 | 8.33 | 8.06 | 8.59 | 8.05 |
| Conversion, wt % | | 72.56 | 68.54 | 70.69 | 64.35 | 69.48 |
| Light Oil Yield, wt % | | 67.24 | 63.53 | 66.17 | 62.19 | 65.94 |
| $H_2/CH_4$, mol/mol | | 0.38 | 2.17 | 1.08 | 2.74 | 1.15 |
| Gasoline Selectivity | | 67.23 | 64.77 | 66.57 | 64.03 | 66.15 |
| Coke Selectivity | | 10.90 | 12.16 | 11.40 | 13.35 | 11.58 |

TABLE 7

Experiment Results of Riser Catalytic Cracking

| | | C | | | D | | |
|---|---|---|---|---|---|---|---|
| Catalyst | | C1 | C2 | C3 | D1 | D2 | D3 |
| Metal | Ni | 5365 | 5365 | 5365 | 8210 | 8210 | 8210 |
| Content μg/g | V | 3218 | 3218 | 3218 | 5346 | 5346 | 5346 |
| | Sb | 0 | 3243 | 0 | 0 | 4013 | 0 |
| | Mg | 0 | 1632 | 0 | 0 | 2134 | 0 |
| | Sr | 0 | 1568 | 0 | 0 | 2006 | 0 |
| | Ce | 0 | 0 | 3521 | 0 | 0 | 3877 |
| | B | 0 | 0 | 1890 | 0 | 0 | 2089 |
| | Sn | 0 | 0 | 1526 | 0 | 0 | 1685 |
| Micro Activity, wt % | | 59.1 | 61.4 | 61.8 | 52.8 | 56.1 | 56.4 |
| Cracked Product | Hydrogen | 0.26 | 0.17 | 0.19 | 0.33 | 0.19 | 0.21 |
| distribution, wt % | Cracked Gas | 13.77 | 14.04 | 14.15 | 12.81 | 13.19 | 13.23 |
| | Gasoline | 38.01 | 40.44 | 41.02 | 42.62 | 43.20 | 43.51 |
| | Diesel | 24.80 | 24.45 | 24.16 | 18.38 | 18.34 | 18.30 |
| | Heavy Oil | 14.49 | 12.70 | 12.21 | 16.43 | 16.49 | 16.18 |
| | Coke | 8.67 | 8.20 | 8.27 | 9.43 | 8.59 | 8.57 |
| Conversion, wt % | | 60.71 | 62.85 | 63.63 | 65.19 | 65.17 | 65.52 |
| Light Oil Yield, wt % | | 62.81 | 64.89 | 65.18 | 61.00 | 61.54 | 61.81 |
| $H_2/CH_4$, mol/mol | | 1.73 | 1.06 | 1.05 | 2.74 | 2.13 | 2.16 |
| Gasoline Selectivity | | 62.61 | 64.34 | 64.46 | 65.38 | 66.29 | 66.41 |
| Coke Selectivity | | 14.28 | 13.05 | 13.00 | 14.47 | 13.18 | 13.08 |

TABLE 8

Analysis of CO in Flue Gas of Regenerator

| | Catalyst | | CO, v % | CO decreased v % |
|---|---|---|---|---|
| A | A1 | M = 0 | 2.64 | |
| | A3 | M = 6000 | 2.26 | 14.4 |
| | A5 | M = 8000 | 2.05 | 22.3 |
| B | B1 | M = 0 | 2.62 | |
| | B3 | M = 6000 | 2.20 | 16.0 |
| | B5 | M = 8000 | 1.79 | 31.7 |
| C | C1 | M = 0 | 2.50 | |
| | C2 | M = 6433 | 1.89 | 24.4 |
| | C3 | M = 6937 | 1.77 | 29.2 |
| D | D1 | M = 0 | 2.51 | |
| | D2 | M = 8153 | 1.27 | 49.4 |
| | D3 | M = 7651 | 1.23 | 50.1 |

Note:
M = Sb + Mg + Sr or Ce + B + Sn

What is claimed is:

1. A process for catalytic cracking of hydrocarbons, which comprises carrying out the catalytic cracking reaction in the presence of a catalytic cracking catalyst and a catalytic promoter,
   wherein said catalytic promoter is in the form of uniform liquid and consists of a composite metal compound,
   wherein said composite metal compound consists of the oxides, hydroxides, organic acid salts, inorganic acid salts or metal organic complex compounds of at least one of the first group metals and those of at least one of the second group metals,
   wherein the first group metals are selected from the group consisting of IIIA, IVA, VA, VIA groups of the Element Period Table, boron, silicon, phosphorus and tellurium,
   wherein the second group metals are selected from the group consisting of alkali earth metals, transition metals and rare earth metals,
   and wherein the content of the first group metal(s) is 5–15% by weight and the content of the second group metal(s) is 2–13% by weight, based on the total weight of said catalytic promoter.

2. The process according to claim 1, wherein the first group metals are selected from the group consisting of antimony, bismuth and combinations thereof.

3. The process according to claim 1, wherein said catalytic promoter is in the form of a solution, colloid, emulsion or suspension comprising said composite metal compound, and dispersing medium.

4. The process according to claim 3, wherein said catalytic promoter is in the form of a solution, comprising said composite metal compound, solvent and cosolvent, said solvent is selected from the group consisting of water, alcohols, hydrocarbons and combinations thereof, and said cosolvent is selected from the group consisting of alcohols, ethers, amines, amides, polyethers, alcohol amines and combinations thereof.

5. The process according to claim 1, wherein the content of said first group metal(s) is 7–10% by weight, the content of said second group metal(s) is 3–7% by weight, based on the total weight of said catalytic promoter.

6. The process according to claim 5, wherein the content of said first group metal(s) is 7.5–9.5% by weight, the content of said second group metal(s) is 4.5–6%, based on the total weight of said catalytic promoter.

7. The process according to claim 4, wherein the content of said cosolvent is 1–15% by weight, based on the total weight of said catalytic promoter.

8. The process according to claim 7, wherein the content of said cosolvent is 3–5% by weight, based on the total weight of said catalytic promoter.

9. The process according to claim 1, wherein said second group metal(s) is selected from the group consisting of Cd, Zn, Mg, Ca, Sr, Ba, Cr, Mo, Mn, Co, Cu, Sc, Ti, La, Ce, Pr, Nd, Sm, Eu and combinations thereof.

10. The process according to claim 1, wherein said catalytic cracking is selected from the group consisting of gas oil fluid catalytic cracking, residuum catalytic cracking and deep catalytic cracking.

11. The process according to claim 10, wherein said catalytic promoter is added into the reactor by mixing it with the catalytic cracking feedstock.

12. The process according to claim 10, wherein said catalytic promoter is added into the reactor by mixing it with the recycled slurry oil.

13. The process according to claim 10, wherein said catalytic promoter is added into the reactor by injecting it at the injection points of reaction termination agents.

14. The process according to claim 10, wherein the catalytic cracking catalyst used is selected from the group consisting of REY type, REHY type and ultra-stable Y type molecular sieve catalysts.

15. The process according to claim 10, wherein said catalytic cracking contains 2000–10000 ppm nickel and 2000–8000 ppm vanadium.

* * * * *